United States Patent [19]
Caldwell

[11] 3,979,129
[45] Sept. 7, 1976

[54] VALVE CONSTRUCTION AND IMPROVED PARTS FOR THE SAME OR THE LIKE

[75] Inventor: Edward N. Caldwell, Knoxville, Tenn.

[73] Assignee: Robertshaw Controls Company, Richmond, Va.

[22] Filed: Mar. 7, 1975

[21] Appl. No.: 556,277

Related U.S. Application Data

[60] Division of Ser. No. 405,130, Oct. 10, 1973, Pat. No. 3,884,587, and a continuation-in-part of Ser. No. 290,558, Sept. 20, 1972.

[52] U.S. Cl. .............................................. 277/110
[51] Int. Cl.² ........................................ F16J 15/18
[58] Field of Search .............. 277/1, 106, 110, 113, 277/114

[56] References Cited
UNITED STATES PATENTS
3,284,086  11/1966  Primrose ................................ 277/1

Primary Examiner—Robert I. Smith
Attorney, Agent, or Firm—Candor, Candor & Tassone

[57] ABSTRACT

A valve construction having a valve bonnet provided with opposed ends and an external peripheral surface intermediate those ends, the internal peripheral surface having locking recesses formed therein. A cover member is telescoped over the valve bonnet and carries a spring retainer having a pair of opposed elbow portions thereof received in the locking recesses of the valve bonnet to detachably lock the cover member to the valve bonnet. A packing gland is carried by the valve bonnet and has a movable valve stem passing therethrough to be sealed by the packing gland while being adapted to move axially relative thereto. The packing gland carries two resilient O-rings separated by an annular lubricant impregnated packing material whereby the valve stem passes axially through the O-rings and the annular packing material to be sealed thereby while being axially movable relative thereto.

2 Claims, 10 Drawing Figures

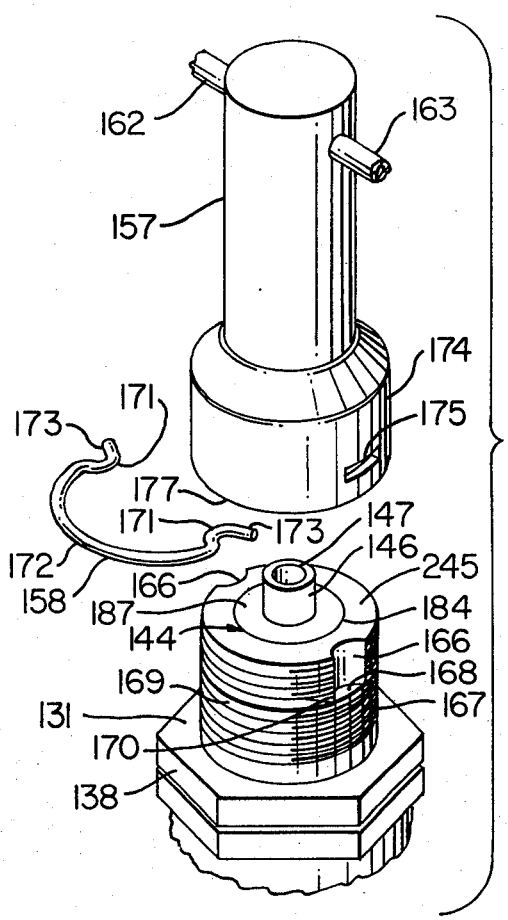
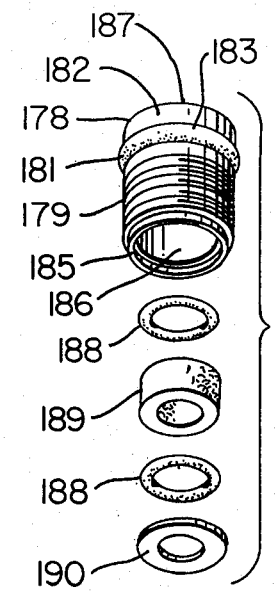
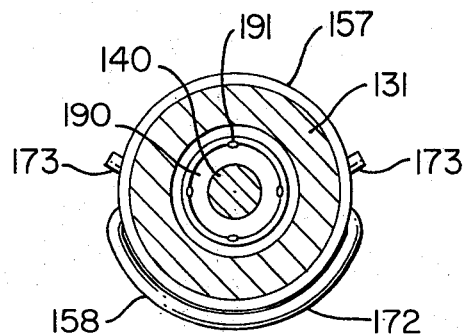

VALVE CONSTRUCTION AND IMPROVED PARTS FOR THE SAME OR THE LIKE

This application is a division of application Ser. No. 405,130 filed Oct. 10, 1973 and now U.S. Pat. No. 3,884,587 and further is a continuation-in-part application of its copending parent patent application, Ser. No. 290,558, filed Sept. 20, 1972, and is assigned to the same assignee to whom the parent application is assigned.

This invention relates to improved parts for a valve construction or other control device.

In particular, one feature of this invention is to provide an improved means for detachably securing a cover member to a valve bonnet of a valve construction or the like.

Another feature of this invention is to provide an improved packing gland means for an axially movable valve stem of a valve construction or the like.

For example, one embodiment of this invention provides a valve construction having a valve bonnet provided with opposed ends and in external peripheral surface intermediate those ends, the external peripheral surface having locking recess means therein. A cover member is telescoped over the valve bonnet and carries a spring retainer having opposed elbow portions thereof passing through slots in the cover member and being received in the locking recess means of the valve bonnet to detachably lock the cover member to the valve bonnet.

The valve bonnet carries a packing gland arrangement through which a movable valve stem passes to be sealed thereto while being movable axially relative thereto. The packing gland means comprises two resilient O-rings separated by an annular lubricant impregnated packing material, the valve stem passing axially through the O-rings and the annular packing material to be sealed thereby while being axially movable relative thereto.

Accordingly, it is an object of this invention to provide improved parts for a valve construction or the like, each improved part having one or more of the novel features set forth above or hereinafter shown or described.

Other objects, uses and advantages of this invention are apparent from a reading of this description, which proceeds with the accompanying drawings forming a part thereof and wherein:

FIG. 2 is a view similar to FIG. 1 and illustrates the valve construction when changed over to the heating cycle thereof whereas FIG. 1 illustrates the valve construction in the cooling cycle thereof.

FIG. 8 is a fragmentary, exploded, perspective view of the various parts for detachably securing the cover member to the valve bonnet of the valve construction of FIG. 5.

FIG. 9 is a cross-sectional view taken on line 9—9 of FIG. 5.

FIG. 10 is an exploded perspective view of the packing gland arrangement for the valve stem of the valve construction of FIG. 5.

Figure 1:
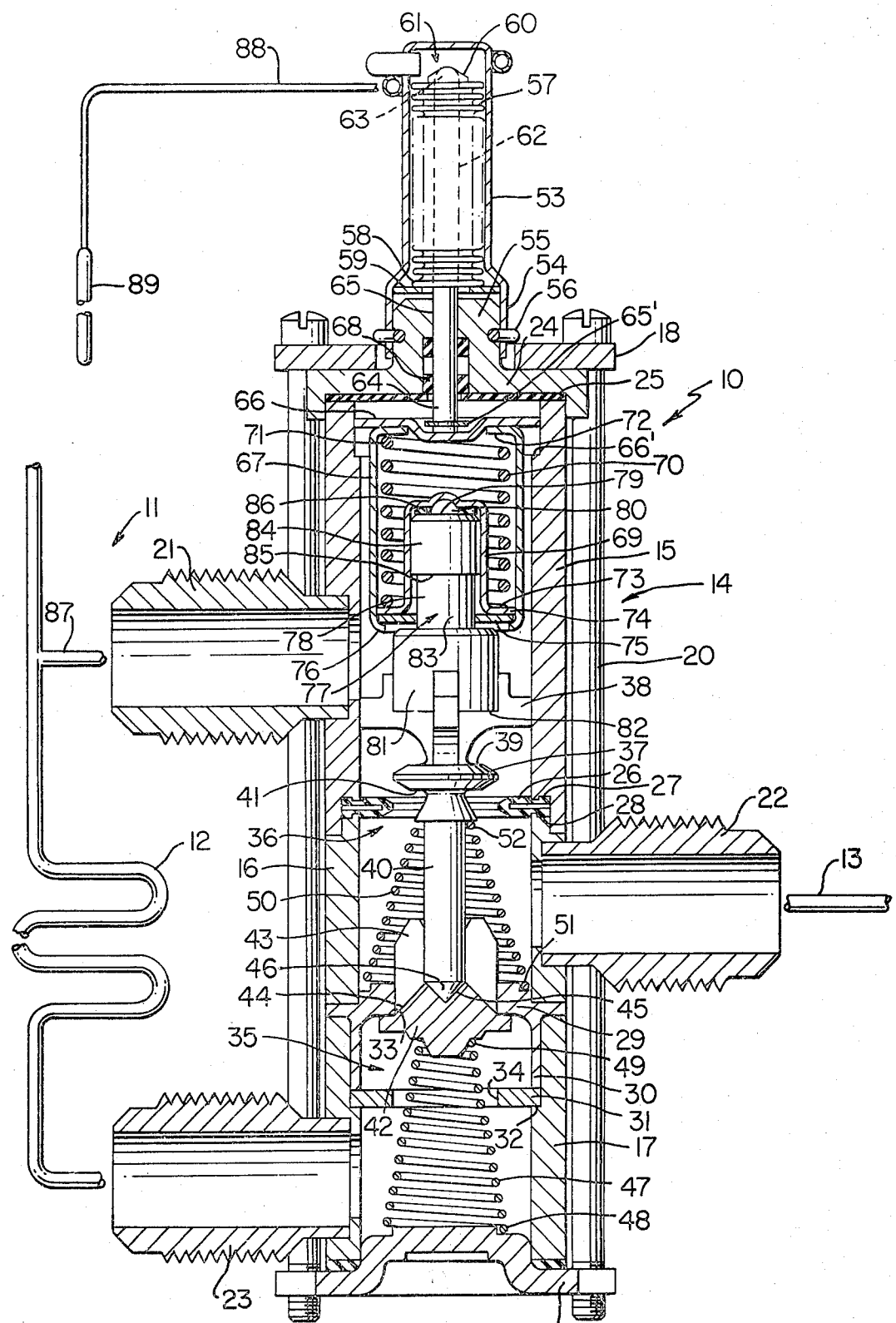
FIG. 1 is a cross-sectional view of a valve construction of this invention utilized in a cooling-heating system that is schematically illustrated in FIG. 1.

While the various features of this invention are hereinafter described and illustrated as being particularly adaptable for providing valve constructions, it is to be understood that the various features of this invention can be utilized singly or in any combination thereof to provide a control device for other purposes are desired.

Therefore, this invention is not to be limited to only the embodiments illustrated in the drawings, because the drawings are merely utilized to illustrate one of the wide variety of uses of this invention.

Referring now to FIG. 1, one improved valve construction of this invention is generally indicated by the reference numeral 10 and is illustrated as being utilized as a changeover valve for a heating-cooling system generally indicated by the reference numeral 11. The system 11 comprises a heat exchanger coil 12 which is adapted to have chilled water supplied therethrough from a supply conduit 13 through the valve construction 10 in a manner hereinafter described to provide a cooling operation and during the heating season is adapted to have hot water supplied therethrough from the supply conduit 13 through the valve construction 10 in a manner hereinafter described.

The valve construction 10 comprises a housing means that is generally indicated by the reference numeral 14 and is formed from a plurality of tubular sections 15, 16 and 17 generally disposed in stacked aligned relation and being compacted between end plate means 18 and 19 that are secured together by a plurality of screws or fastening members 20 passing through suitable openings in the upper end plate 18 and being threaded into suitable threaded openings in the lower end plate or yoke 19 is illustrated to secure the tubular sections 15, 16 and 17 together. The sections 15, 16 and 17 are adapted to be rotated in any rotational position relative to each other so as to respectively position coupling fittings 21, 22 and 23 carried thereby in the desired angular positions relative to each other as well as to the housing means 14 to facilitate the coupling of the fittings 21–23 in the control system 11 or other control system as desired.

The housing means 14 includes an end member 24 disposed between the upper end plate means 18 and the upper end of the tubular section 15 with such end member 24 closing off the upper open end of the tubular section 15 while having a rubber gasket 25 disposed therebetween to provide a seal when the upper part of the device 10 is moved as will be apparent hereinafter.

Similarly, a resilient valve seat member 26 is adapted to be disposed between cooperating portions 27 and 28 of the tubular sections 15 and 16 which thereby position and the resilient valve seat 26 within the housing means 14, which at the same time resilient valve seat member 26 serves as a gasket preventing leakage between tubular sections 15 and 16.

Another valve seat member 29 is held between the lower and upper ends of the tubular sections 16 and 17 as illustrated, the valve seat member 29 having a tubular part 30 extending therefrom and inwardly down the inside peripheral surface of the tubular section 17 to abut against another washer-like valve seat member 31 and hold the same against an annular shoulder 32 on the tubular section 17 as illustrated. Valve seat member 29 is made of plastic or other suitable material such that it forms a gasket where it engages tubular sections 16 and 17 thus preventing leakage therefrom.

The two valve seat members 29 and 31 respectively have valve seats or valve ports 33 and 34 passing therethrough to be controlled in a manner to be hereinafter described, the valve seat members 29 and 31 cooperating together to define a lower valve seat means that is generally indicated by the reference numeral 35 in the housing means 14 while the valve seat member 26 defines upper valve seat means in the housing 14 and which is generally indicated by the reference numeral 36.

A valve member 37 is disposed in the housing means 14 and has a plurality of fins or guides 38 extending from the upper side 39 thereof and being disposed in sliding engagement with the internal peripheral surface of the tubular section 15 as illustrated, the valve member 37 having a stem 40 extending from the other side 41 thereof and projecting toward the lower valve seat means 35.

Figure 2:
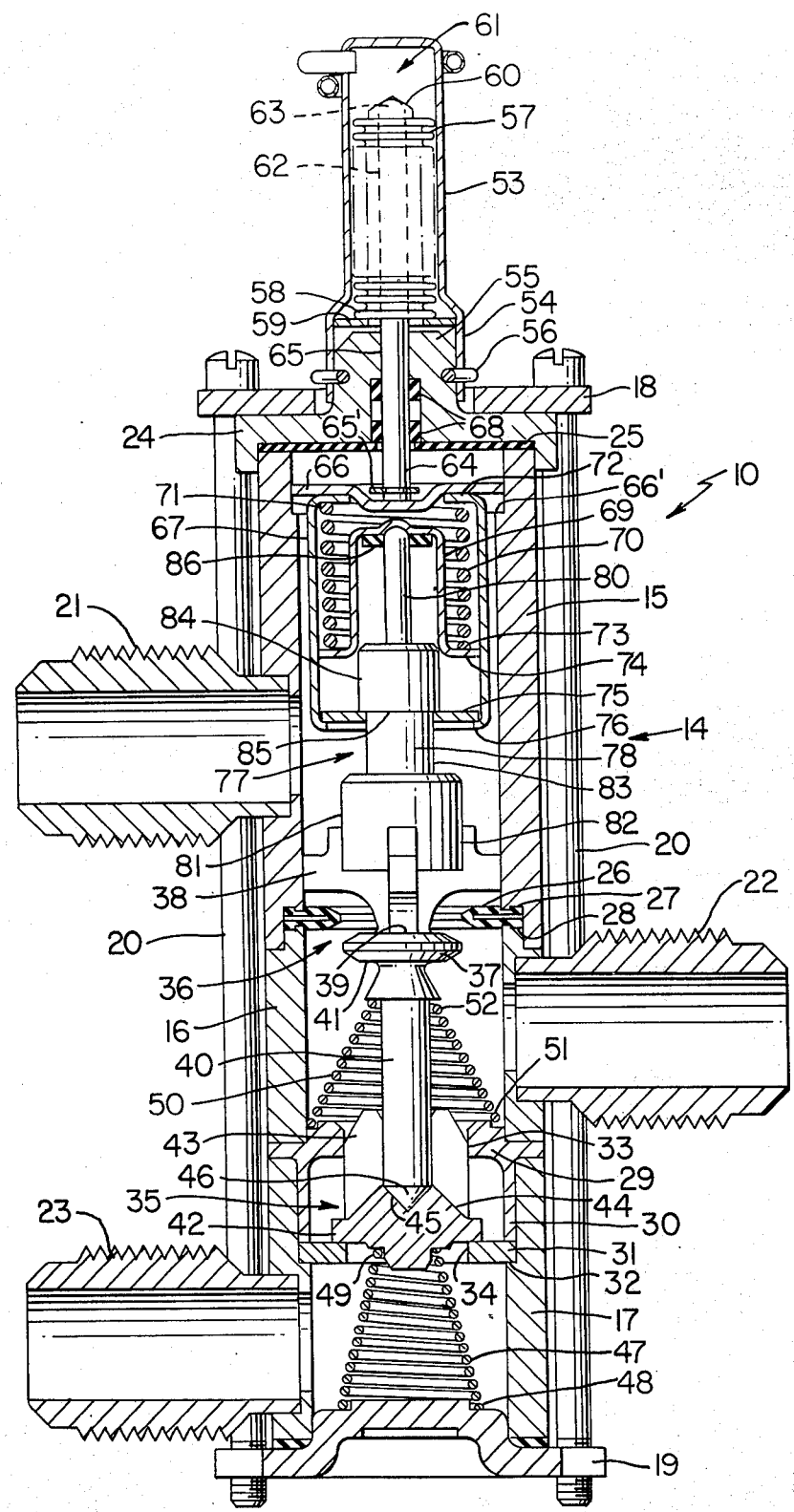

Another valve member 42 is disposed intermediate the valve seats 33 and 34 of the valve seat means 35 as illustrated in FIG. 1 and has a plurality of fin-like guides 43 extending from the upper side 44 thereof and passing through the valve seat 33 so as to guide movement of the valve member 42 in its movement from the valve seat 33 to the valve seat 34 between the positions thereof illustrated in FIGS. 1 and 2. The side 44 of the valve member 42 has an opening 45 therein which receives the end 46 of the stem 40 as illustrated. A compression spring 47 has one end 48 bearing against the end plate 19 and the other end 49 bearing against the valve member 42 to tend to urge the valve member 42 into continuous engagement with the stem 40 of the valve member 37 so that the valve members 42 and 37 tend to move in unison relative to the housing means 14.

Another compression spring 50 has one end 51 bearing against the valve seat member 29 and the other end 52 thereof bearing against the valve member 37 to tend to urge the valve member 37 upwardly in the drawings in the same direction that the other spring 47 is tending to urge the other member 42 for a purpose hereinafter described.

A cap or cup-shaped member 53 has its open end 54 disposed over an upwardly directed projection 55 of the end member 24 and is secured thereto by a wire clip 56 as illustrated. A bellows 57 is disposed within the end cap 53 and has its lower open end 58 interconnected to an annular plate 59 that is sealed in the open end 54 of the cup 53 while its upper closed end 60 is disposed within a chamber 61 defined within the end cap 53.

The details of the wire clip 56 and how the cap or cover member 53 is detachably secured to the valve bonnet or projection 55 of the end member 24 will be hereinafter fully described in connection with the embodiment of FIGS. 5–10.

An actuating pin 62 is disposed within the interior of the bellows 57 and has its upper end 63 bearing against the closed end 60 of the bellows 57 while its lower end 64 passes through the annular washer 59 and a suitable opening 65 passing through the end member 24 and into the tubular housing section 15 as illustrated to bear against a flange or plate 66 carried at the upper end of a cylindrical cage 67. If desired, dynamic O-ring seals 68 can be disposed within the opening 65 in the end member 24 and through which the actuating pin 62 passes in order to prevent any liquid from within the housing 14 from passing into the interior of the bellows 57. A snap ring 65' is carried by actuating pin 65 to prevent pin 62 from being removed or being blown out by pressure when the bellows 57 and its assembly is removed.

A flanged cup 69 is disposed within the cage 67 and is normally biased downwardly by a compression spring 70 that is disposed within the cage 67 and has its upper end 71 bearing against an inwardly turned portion 72 of the cage 67 and its lower end 73 bearing against an outwardly turned flange 74 at the open end of the cup 69 as illustrated to tend to urge the cup 69 against an inwardly turned lower end 76 thereof as illustrated.

A thermal element 77 is disposed within the cup 69 and comprises a body or housing 78 having a piston rod 80 extending out of the upper end 79 thereof. A large cylindrical lower part 81 of the body 78 of the thermal element 77 is received within suitable notches 82 formed in the guide fins 38 of the valve member 37 as illustrated so as to tend to move in unison with the valve member 37. An intermediate reduced cyclindrical part 83 of the body 78 of the thermal element 77 loosely passes through the washer 75 of the cage 67 and positions a larger cylindrical upper part 84 of the body 78 of the thermal element 77 within the cup 69.

The thermal element 77 and cage 67 provide a length changeable link between the actuating pin 62 and the valve members 37 and 42 for changeover purposes hereinafter described.

The thermal element 77 contains a wax charge which will expand upon an increase in temperature to force the piston 80 out of the body 78 and upon cooling will contract and permit an external force on the piston 80 to force the piston 80 back into the body 78 as illustrated in FIG. 1.

A resulting shoulder 85 between the body parts 84 and 83 of the thermal element 77 is engageable with the lower washer 75 of the cage 67 to provide a stop for the thermal element 77 and accurately control the overall length of the cage structure between the actuating pin 62 and the valve member 37 as will be apparent hereinafter.

The details of the structure and operation of the thermal element 77 are well known and need not be further described in detail. However, it has been found according to the teachings of this invention that such a thermal element 77 when utilizing an expanding charge to extend a piston has an inherent disadvantage when it is emersed in a liquid under high static pressure for extended periods with the charge contracted and no load on the piston thereof. Under these conditions, the liquid leaks along the piston and collects beneath it to change the effective stroke of the piston upon subsequent expansion of the charge. This leakage is not a problem when the charge is expanded and exerting a force on the piston. Accordingly, this invention provides means for isolating the piston 80 from the surrounding liquid when the charge in the terminal element 77 is contracted.

In particular, an annular gasket 86 is positioned in the closed end of the cup 69 and is engageable by the upper end of the body portion 84 of the thermal element 77 when the piston 80 is fully retracted as illustrated in FIG. 1 by the force of the compression spring 50 maintaining a positive seal against the closed end of the cup 69 against the annular gasket 86.

The fitting 22 of the tubular section 16 of the housing means 14 comprises an inlet for the valve construction 10 and is adapted to be coupled to the water supply conduit 13 in any suitable manner. The fitting 23 of the tubular section 17 of the housing 14 comprising an outlet of the valve construction 10 and is adapted to be coupled to the heat exchanger coil 12 in any suitable manner to thereby direct fluid through the heat exchanger coil 12. The fitting 21 of the tubular section 17 of the housing 14 comprises a by-pass outlet adapted to be interconnected to a coil by-pass conduit 87 in any suitable manner so that any fluid being directed out of the outlet 21 will by-pass the heat exchanger coil 12.

The interior chamber 61 of the upper cup or cap 53 of the housing means 14 is adapted to be fluidly interconnected by a conduit means 88 to a temperature sensing bulb 89 positioned to sense the temperature of the space being controlled by the heat exchanger 12 so that the fluid in the chamber 61 acting on the bellows 57 extends upon a sensed increase in the output temperature effect of the coil 12 and contracts upon a sensed decrease in output temperature effect of the coil 12 for a purpose hereinafter described.

From the preceding description of the valve construction 10 and its interconnection in the system 11, it can be seen that the valve construction 10 can be formed of a plurality of relatively simple parts disposed in stacked and aligned relation in the housing means 14 with the inlet 22 and outlets 21 and 23 thereof adapted to be rotationally positioned relative to each other to provide different angles relative to the housing means 14 before the same are secured in place by the fastening members 20.

The operation of the valve construction 10 of this invention as utilized in the control system 11 will now be described.

When the system is set in the cooling mode as illustrated in FIG. 1, chilled water is supplied to the inlet 22 by the conduit means 13. The chilled water cools the body 78 of the thermal element 77 causing the wax charge therein to contract and position the piston 80 in the fully retracted position illustrated in FIG. 1. The relative position of the various parts of the cage 67 and thermal element 77 is such that the same is in its shortest linkage configuration between the actuating pin 62 and the valve member 37. Also, the parts illustrated in FIG. 1 are in the position when the system 11 is fully satisfied, i.e., the output temperature effect of the coil 12 is at or below desired cooling temperature effect thereof so that the fluid in the bulb 89, and thus, in the chamber 61 of the end cap 53 is in its most contracted condition whereby the bellows 57 is in its most expanded condition and permits the spring means 50 and 47 to urge the valve members 42 and 37 upwardly until the valve member 42 fully seats against the valve seat 33 to prevent further upward movement thereof and the spring 50 has caused the valve member 37 to move upwardly to fully move the cage 67 to its uppermost position for the satisfied condition illustrated and maintain the seal around the piston 80 of the thermal element 77 for the purpose previously described. Thus, with the valve member 42 fully seated on the valve seat 33, no chilled water from the inlet 22 is directed through the coil 12 as the entire amount of chilled water being supplied to the inlet 22 goes through the valve seat 26 to the by-pass outlet 21, the valve member 36 being so positioned in FIG. 1 that the same provides full flow through the by-pass valve 26 to the by-pass outlet 21.

However, an increase in temperature being sensed by the bulb 89 will cause expansion of the liquid charge therein and a flow of liquid into the chamber 61 to compress the bellows 57. This causes downward movement of the entire assembly of the actuator pin 62, cage 67 and thermal element 77 which moves the valve disc 37 toward the valve seat 26 and the valve member or disc 42 away from the valve seat 33 a certain amount. This results in an increase in flow of chilled water through the outlet 23 to the coil 12 and a decrease in the flow of chilled water from the inlet 22 to the by-pass outlet 21 to tend to lower the output temperature effect of the coil 12. However, a further temperature increase at the bulb 89 will move the valve disc 42 further from the valve seat 33 and position the valve disc 37 closer to the by-pass valve seat 26 to increase the flow of chilled water to the coil 12 and decrease the flow of chilled water to the by-pass outlet 21. As the increase in output temperature effect of the coil 12 causes the valve member 37 to approach the valve seat 26, a fluid-tight seal is not effected between the valve disc 37 and the valve seat 26 but a slight leakage to the by-pass 21 has little effect on the operation of the system 11. However, an advantage of this slight leakage through the valve seat 26 at this time is that the thermal element 77 will always sense supply water temperature.

It can be seen that when the increase in temperature being sensed by the bulb 89 positions the upper valve member 37 to substantially close the valve seat 26, the valve member 42 has been moved away from the valve seat 33 a distance sufficient to provide complete fluid flow therethrough as the valve member 42 is only intermediate the valve seats 33 and 34 so that the same does not cause the valve seat 34 to close during such full cooling operation of the valve construction 10. It can be seen that a further increase in temperature sensed at bulb 89 would cause valve member 37 to go through valve seat 26 opening up the by-pass while valve member 42 would proceed to restrict flows to the heat exchanger coil 12 by approaching valve seat 34 were it not for plate 66 of cage 67 engaging shoulder 66' at a proper position to prevent this from happening.

Conversely, a decrease in temperature at the bulb 89 will cause upward movement of the valve members 37 and 42 to decrease the flow of chilled water to the coil 12 and increase the flow of chilled water to the coil 12 and increase the flow of chilled water to the by-pass 21.

Thus, it can be seen that during the cooling operation of the system 11 with the valve construction 10 in the condition illustrated in FIG. 1, the bellows 57 and actuating pin 62 provides a condition responsive means responsive to the condition being sensed by the bulb 89 to cause movement of the valve members 37 and 42 relative to the upper sides of the valve seat means 36 and 35 to control the flow of fluid from the inlet 22 to the outlets 21 and 23.

When the system 11 is changed over to the heating mode thereof, hot water is supplied to the inlet 22 by the conduit 13 and the hot water in the housing 14 heats the body 78 of the thermal element 77 to expand its wax charge and force the piston 80 to its extended position as illustrated in FIG. 2. Extension of the piston 80 causes downward movement of the body 78 of the thermal element 77 until the shoulder 85 thereof seats on the split washer 75 because overrun spring 70 has a heavier load than the combined load of springs 47 and 50. Thereafter, further expansion of the piston 80 causes the compression of spring 70 to the position illustrated in FIG. 2. Thus, the linkage provided by the cage 67 and the thermal element 77 is then at its maximum length between the actuating pin 62 and the valve member 37 with the relative position of the parts being as illustrated in FIG. 2.

During the changeover of the valve construction 10 from the cooling mode illustrated in FIG. 1 to the heating mode illustrated in FIG. 2, the valve element 37 is moved downwardly against the bias of the springs 50 and 47 and passes through the resilient valve seat 26 and if the system 11 is fully satisfied as illustrated in FIG. 2, the valve member 42 bottoms out against the valve seat 34 to close the same while the valve member 37 is passed completely through the valve seat 26 to provide a position for full fluid flow therethrough.

With the system 11 fully satisfied in the heating mode illustrated in FIG. 2, the temperature sensing bulb 89 is sensing an output temperature effect of the coil 12 at or above the desired temperature so that the fluid in the chamber 61 of the end cap 53 is at its maximum volume and has forced the bellows 57 downwardly and, thus, the actuating pin 62 downwardly to the position illustrated in FIG. 2 to maintain the valve member 42 against the valve seat 34 so that the entire flow of hot water from the inlet 22 pases through the by-pass valve seat 26 to the by-pass outlet 21.

A decrease in output temperature at the bulb 89 below the desired output temperature effect will cause constriction of the liquid charge in the bulb 89 and, thus, expansion of the bellows 57 with a corresponding upward movement of the actuating pin 62, cage 67, thermal element 77 and the valve members 37 and 42 under the force of the compression springs 50 and 47. This moves the valve disc 42 away from the valve seat 34 to permit some hot water to flow to the outlet 23 and, thus, to the coil 12 to tend to increase its output temperature effect while the valve disc 37 moves toward the by-pass valve seat 26 to reduce the flow of hot water to the by-pass outlet 21. Similar to the cooling situation, a further decrease in temperature sensed at bulb 89, FIG. 1, would throw the valve into reverse operation except that plate 66 engages gasket 25 at a position to prevent this from happening. A further decrease in output temperature effect moves the valve disc 42 upwardly farther from the seat 34 to increase the flow of hot water to the coil 12 and positions the valve disc 37 immediately adjacent the valve seat 26 to reduce the flow of hot water to the by-pass outlet 21 to a minimum. Convesely, an increase in temperature at the bulb 89 will cause the bellows assembly 57 to move the valve element 42 downward toward the valve seat 34 to reduce the flow of hot water to the coil 12 and increase the flow to the by-pass 21 by correspondingly moving the valve member 37 farther away from the valve seat 26.

When the system is again changed back to the cooling mode illustrated in FIG 1, the chilled water supplied to the inlet 22 cools the body 78 of the thermal element 77 and causes contraction of its wax charge. This permits the springs 70 and 50 to compress the cage 67 and thermal element 77 to its shortest dimension forcing the piston 80 into the body 78 and moving the valve disc 37 through the valve seat 26. With the parts in these positions, the end of the body 78 of the thermal element 77 is seated on the sealing gasket to seal the piston 80 from the water in the system.

Thus, it can be seen that the valve construction 10 of this invention is readily adapted to control the heat exchanger system 11 and cause a changeover from the cooling cycle thereof to the heating cycle thereof with the valve members 37 and 42 acting on one side of the pair of valve seat means 36 and 35 for a cooling operation of the system 11 and acting on the other side of the valve seat means 36 and 35 for a heating cycle of operation of the system 11.

Also, it can be seen that the valve construction 10 of this invention is easily assembled as the assembly thereof merely amounts to a simple stacking of the parts together. In particular, the valve construction 10 is assembled upside down starting with the bellows assembly 57 followed by the yoke or upper end plate 18, cap 53, actuating pin 62, washer 25, extensible linkage subassembly 67, 77, valve body section 15, valve element 37, valve seat 26, valve section 16, spring 50, valve seat member 29, valve member 42, valve seat member 31, valve section 17, spring 47, end cap 19 and securing members 20.

Each of the three valve body sections 15, 17 and 16 can be positioned in any one of four angular positions between the securing members 20 to produce the desired body configuration and then the securing members 20 can be installed to secure all of the parts in place as illustrated.

Thus, the valve body sections 15, 16 and 17 can be selectively positioned before the securing members 20 are installed, However, the valve body can be readily modified in the field by removing at least one fastening member 20 and loosening the others so that the valve sections 15, 16 and 17 can be rotated to the desired position. Thereafter the securing members 20 are tightened.

It can be seen that in order to prevent the power element 77 from unloading when the bellows arrangement 57 cools sufficiently with cold water being supplied at inlet 22 for the valve member 42 to go against the upper seat 33 as illustrated in FIG. 1, the spring 50 is adapted to act upwardly to maintain a load on the power element 77 to maintain the upper end thereof in sealing relation with the sealing gasket 36 so as to exclude water from the interior of the power element 77 when high static pressures are present.

Figures 3, 4:
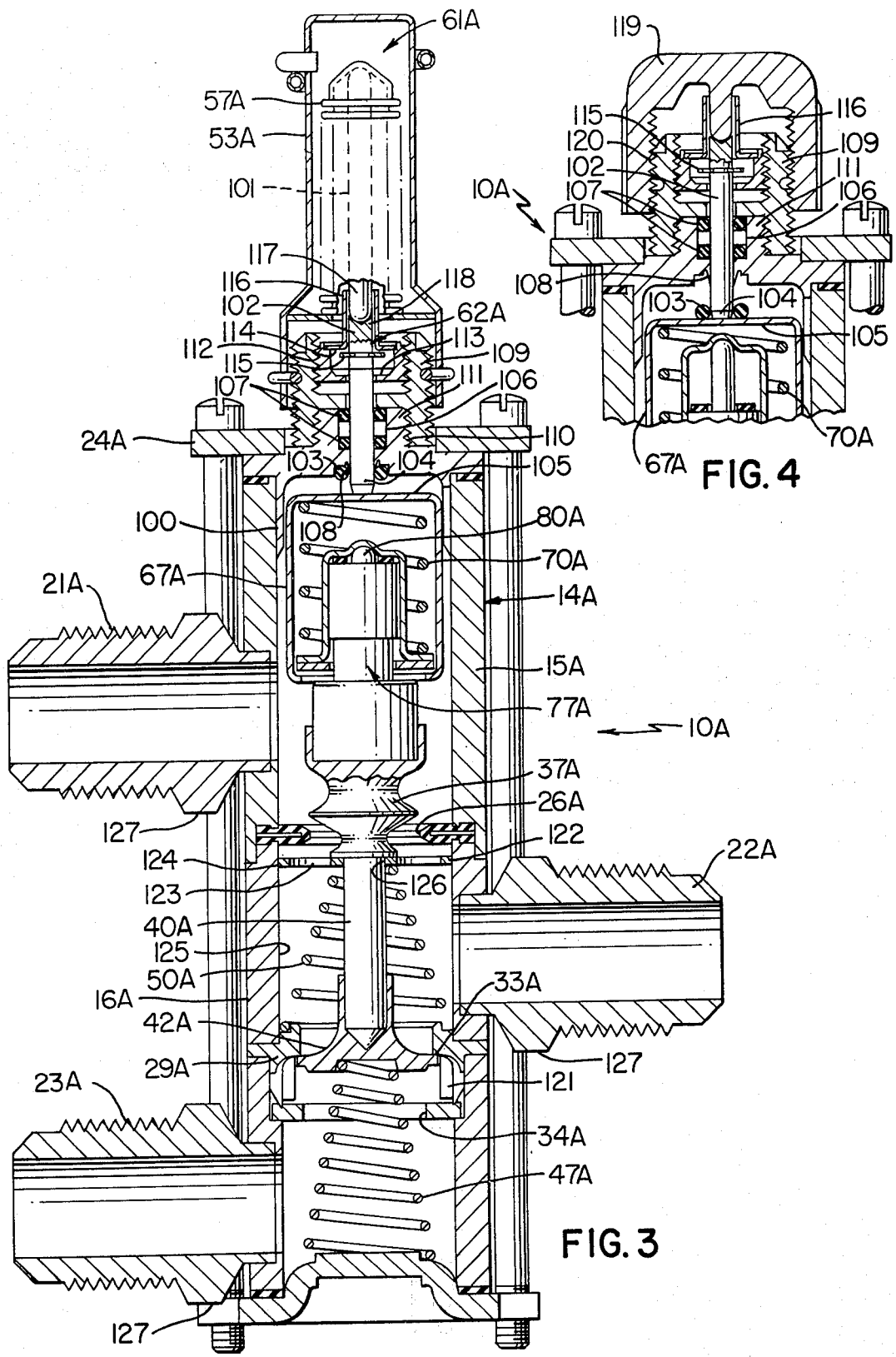
FIG. 3 is a view similar to FIG. 1 and illustrates another embodiment of the valve construction of this invention.
FIG. 4 is a fragmentary view of the top part of the valve construction of FIG. 3 with the bellows assembly removed and replaced by an end cap.

Another valve construction of this invention is generally indicated by the reference numeral 10A in FIGS. 3 and 4 and parts thereof similar to the valve construction 10 are indicated by like reference numerals followed by the reference letter "A".

As illustrated in FIG. 3, the end wall member 24A of the housing means 14A of the valve construction 10A is modified from the form illustrated in FIGS. 1 and 2 so as to be provided with three depending guide legs 100 extending within the tubular housing member 15A whereby the legs 100 guide reciprocal movement of the cage 67A of the change over assembly. Thus, the cage 67A does not carry the upper plate 66 as in the embodiment of FIGS. 1 and 2 because other means are provided for controlling the movement of the cage 67A to prevent the valve construction 10 from going into a reverse operation on a heating or cooling cycle as was provided by the end plate 66 and shoulder means 66' or gasket 25 as previously described.

The actuating pin 62A of the valve construction 10A is formed of two parts 101 and 102 for a purpose hereinafter described with the parts 101 and 102 being disposed in aligned abutting relation. An O-ring 103 is disposed about the lower end 104 of the lowermost part 102 to provide a back-seat against which the closed end 105 of the cage 67A will engage under the force of the compression spring 70A to prevent fluid leakage when the stem 62A is removed for packing replacement purposes. For example, the end piece 24A has a chamber 106 provided therein and in which is disposed the sealing packing means 107.

The end plate member 24A has a part 108 thereof formed as a scraper to clean the stem part 102 as it moves back and forth in the end plate 24A whereby the scraper 108 continuously cleans the stem part 102 and thereby helps to prevent wear on the packing 107.

The packing 107 is confined within the chamber 106 of the end plate 24A by a retaining nut 109 that is threaded onto external threads 110 of an outwardly projecting portion 111 of the end plate member 24A as illustrated.

An adjustable heating and cooling stop assembly 112 is threaded within the retaining nut 109 and confines movement of the stem part 102 within the limits of a lower internal shoulder 113 thereof and an upper internal shoulder 114 thereof because the stem part 102 carries a snap ring 115 disposed within the stop assembly 112. The distance between the internal faces or shoulder 113 and 114 of the stop assembly 112 is exactly calculated so that when the stop assembly 112 is properly adjusted to account for all tolerance variation in a particular valve assembly, face 113 will prevent the valve construction 10A from going into reverse operation on the cooling cycle thereof and the face 114 will prevent the valve construction 10A from going into reverse operation on the heating cycle thereof.

In particular, the valve construction 10A illustrated in FIG. 3 is disposed in its cooling mode wherein chilled water is supplied to the inlet 22A and when the system is fully satisfied, as illustrated in FIG. 1, the output temperature of the heat exchanger is at or below the desired cooling temperature effect thereof so that the fluid in the chambers 61A of the end cap 53A is in its most contracted condition whereby the bellows 57A is in its most expanded condition and permits the spring means 50A and 47A to urge the valve members 42A and 37A upwardly until the valve member 42A fully seats against the valve seat 33A to prevent further upward movement thereof and the spring 50A has caused the valve member 37A to move upwardly to fully move the cage 67A to its uppermost position for a satisfied condition as illustrated and maintain the seal around the piston 80A of the terminal element 77A for the purpose previously described.

Thus, with the valve member 42A fully seated on the valve seat 33A, no chilled water from the inlet 22A is directed to the heat exchanger as the entire amount of chilled water being supplied to inlet 22A goes through the valve seat 26A to the bypass outlet 21A, the valve member 37A being so positioned in FIG. 3 that the same provides full flow through the bypass valve 26A to the bypass outlet 21A.

However, an increase in temperature being sensed by the temperature sensing bulb will cause expansion of the liquid charge therein and a flow of liquid into the chamber 61A to contract the bellows 57A. This causes downward movement of the entire assembly of the actuator 62A, cage 67A and thermal element 77A which moves the valve disc 37A toward the valve seat 26A and the valve member 42A away from the valve seat 33A a certain amount. As the increase in output temperature effect of the heat exchanger causes the valve member 37A to approach the valve seat 26A, further increase in temperature sensed by the bulb would cause the valve member 37A to go through the valve seat 26A and open up the by-pass while the valve member 42A would approach the seat 34A to restrict the flow to the heat exchanger were it not for the snap ring 115 on the stem part 102 engaging against the face of the stop assembly 112 to prevent this from happening.

Conversely, when the valve assembly 10A is in the heating mode thereof wherein the valve member 37A is on the lower side of the valve seat 26A in the same manner as the valve assembly 10 of FIG. 2, a decrease in sensed temperature would throw the valve into reverse operation by an attempt to move the valve member 37A through the valve seat 26A except for the fact that the snap ring 115 will engage against the upper face 114 of the stop assembly 112 to prevent the valve member 37A from passing through the valve seat 26A in the same manner as the plate 66 engages against the gasket 25 of the valve assembly 10 previously described to prevent such a reverse operation.

Thus, it can be seen that the stop assembly 112 within the retaining nut 109 provides an adjustable stop means for the actuator pin 62A of the valve assembly 10A to prevent the same from going into reverse operation on both the cooling and heating cycles thereof.

Of course, the above term "reverse operation" refers to a reversal of normal flow response, not reverse in the sense of a "direct" or "reverse" acting valve as is commonly used.

The adjustable stop assembly 112 has a tubular guide 116 extending therefrom and is utilized to guide the lower end 117 of the upper stem part 101 into alignment with the upper part 118 of the lower stem part 102. By having a two part actuating stem 62A, the valve assembly 10A can be shipped without the thermal system which includes the bellows assembly 57A in the manner illustrated in FIG. 4 wherein it can be seen that a cap 119 is threaded on external threads 120 of the retaining nut 108, the cap 119 thus protecting the end of the valve assembly 10A and serving as a hand adjustment for use during the construction of building into which the valve construction 10A will be put and before the thermal systems have been installed. However, when the thermal system is to be installed, the cap 119 is removed and thrown away and the bellows arrangement 57A is provided thereon in the manner illustrated in FIG. 3 for the purpose previously described.

As illustrated in FIG. 3, the valve seat member 29A is provided with downwardly directed guide fins 121 which guide the movement of the valve member 42A between the valve seats 33A and 34A in the same manner that the guide means 43 on the valve member 42 of the valve assembly 10.

A guide washer 122 has been added to the valve stem 40A of the valve construction 10A and has a plurality of openings 123 passing therethrough, the guide washer 122 having its outer periphery 124 disposed in sliding relation with the internal peripheral surface 125 of the tubular housing section 16A while its inner periphery 126 is disposed about the stem 40A and is held upwardly against the same by the compression spring 50A. In this manner, the guide rings 38 of the valve stem 40 of the valve construction 10 of FIG. 1 can be eliminated.

If desired, suitable hex sections 127 can be added to the inlet 22A and outlet 21A and 23A fittings to facilitate tightening of mating nuts thereon.

Therefore, it can be seen that the valve construction 10A functions in substantially the same manner as the valve construction 10 previously described for the change over purpose and prevents adverse reversal of operation on heating and cooling cycles thereof through the use of the adjustable stop member 112.

Another valve construction of this invention is generally indicated by the reference numeral 130 in FIGS. 5-10 and comprises a valve bonnet 131 having an external threaded portion 132 threaded into a threaded bore 133 of a valve seat housing 134 provided with an inlet 135 that is separated from an outlet 136 by a valve seat 137, the valve bonnet 131 having an outwardly directed annular flange 138 sealed to the valve housing 134 by an annular gasket 139 or the like.

The valve bonnet 131 carries a movable valve stem 140 having a resilient valve member 141 at the lower end thereof for opening and closing the valve seat 137 in a manner hereinafter described, the valve stem 140 also carrying an annular shoulder defining part 142 and passing axially through a stepped bore 143 passing axially through the valve bonnet 131.

The valve bonnet 131 carries a packing gland arrangment that is generally indicated by the reference numeral 144 and seals against the valve stem 140 to seal a lower chamber 145 of the stepped bore 143 from the upper end 145 of the valve bonnet 131 while permitting the valve stem 140 to move axially relative thereto.

The upper end 146 of the valve stem 145 is provided with a recess 147 therein which receives the lower end 148 of a pin or rod 149 disposed inside a bellows cup 150 and having its upper end 151 bearing against the under side of the closed end 152 of the bellows cup 150 in much the same manner as the valve stem 65 previously described for the valve construction.

A compression spring 153 is disposed in the chamber 145 of the valve bonnet 131 and has one end 154 bearing against the valve bonnet 131 while the outer end 155 bears against the annular shoulder 142 of the valve stem 140 to tend to move the valve stem 140 axially upwardly until the valve means 141 abuts against the lower end 156 of the valve bonnet 131 to fully hold the valve member 141 in an open position relative to the valve seat 137.

A cover member or cap 157, similar to the cap 53 of FIG. 1, is detachably secured in telescoping relation over the valve bonnet 131 by a wire retainer means 158 in a manner hereinafter described, the cap 157 having an internal annular flange 159 sealed thereto and having the lower end 160 of the bellows 150 sealed thereto whereby the external peripheral surface of the bellows cup 150 cooperates with the end cap 157 to define a chamber 161 therein that is adapted to be subjected to fluid pressure that is directed into and from the chamber 161 by suitable conduit means 162 and 163 that sealingly project through suitable openings 164 and 165 in the end cap 157.

In this manner, the valve construction 130 operates to close the valve seat 137 when sufficient fluid pressure builds up in the chamber 161 to act on the bellows cup 150 and cause the end 152 of the bellows cup 150 to move downwardly and thereby move the pin 149 and valve stem 140 axially downwardly in opposition to the force of the compression spring 153 until the valve member 141 fully seats against the valve seat 137 to thereby close the valve seat 137 and prevent fluid communication between the inlet 135 and outlet 136. However, when the fluid pressure in the chamber 161 that is directed thereto by the conduit 162 and/or the conduit 163 falls to a certain value so that the force of the compression spring 153 can overcome the force of the fluid pressure in the chamber 161 acting on the bellows 150, the spring 153 axially moves the valve stem 140, pin 149 and bellows end 152 axially upwardly to permit the valve member 141 to move away from the valve seat 137 and thereby again interconnect the inlet 135 to the outlet 136.

As previously stated, one of the features of this invention is to provide improved means for detachably securing the cover member 157 to the valve bonnet 131. Thus, the details of the cover member 157, valve bonnet 131 and wire spring retainer 158 will now be described.

Figure 7:
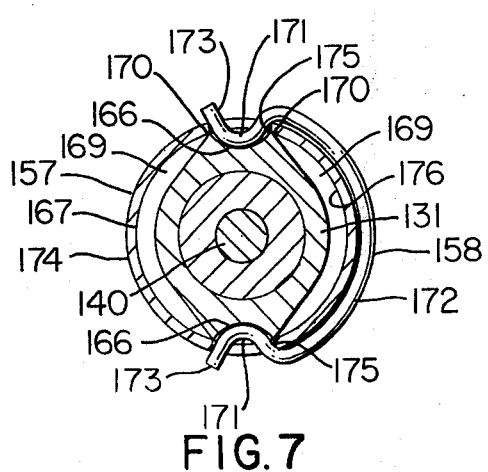
FIG. 7 is a view similar to FIG. 6 and illustrates the method of detachably securing the cover member of this invention to the valve bonnet of this invention.
Figure 6:
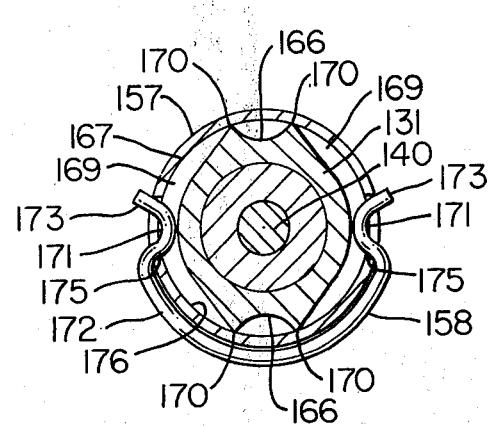
FIG. 6 is a cross-sectional view taken on line 6—6 of FIG. 5.

As illustrated in FIGS. 6-8, the valve bonnet 131 has a pair of longitudinal recesses 166 extending down the upper external peripheral surface 167 of the valve bonnet 131 from the upper end 145 thereof to an intermediate part of the valve bonnet 131 where the recesses 166 respectively define shoulders 168 in the valve bonnet 131 as illustrated. Adjacent the shoulders 168, a pair of transverse recesses 169 are respectively formed intermediate the longitudinal recesses 166 and are respectively separated therefrom by point-like cam means 170 of the valve bonnet 131 for a purpose hereinafter described whereby the recesses 166 and 169 form locking recess means for the wire retainer 158 as will be apparent hereinafter.

The wire retainer 158 is formed of spring-like rod material and is so bent that the same defines a pair of opposed inwardly directed elbows 171 interconnected together at adjacent ends of the elbows 171 by an arcuate part 172 while the other ends of the elbows 171 are interconnected to outwardly directed ends 173 as illustrated.

The lower cylindrical part 174 of the cover member or cap 157 has a pair of opposed rectangular slots 175 formed therein and adapted to respectively receive the elbows 171 therein when the wire retainer 158 has the arcuate portion 172 encircling the same in the manner illustrated in FIG. 7 whereby the elbows 171 extend inwardly beyond the internal peripheral surface 176 of the cylindrical portion 174 of the cover member 157.

Thus, it can be seen that the spring retainer 158 is adapted to be carried by the cover member 157 as the elbows 171 extend through the rectangular slots 175 as illustrated in FIG. 7 and the natural resiliency of the spring retainer 178 maintains the elbows 171 in their fully inwardly projected position as illustrated in FIG. 7, the wire retainer 158 merely being snap fitted onto the lower cylindrical part 174 of the cap 157 until the elbows 171 can snap into the slots 175.

When it is desired detachably secure the cover member 157 onto the valve bonnet 131, the open end 177 of the cover member 157 is telescoped over the upper end 145 of the valve bonnet 131 and the elbows 171 of the spring retainer 158 are oriented with the longitudinal slots 166 by either initial alignment therewith or by rotation of the end cap 157 until the elbows 171 align with the longitudinal slots or recesses 166. When the elbows 171 are aligned with the recesses 166 as illustrated in FIG. 7, the cover member 157 is adapted to be telescoped downwardly on the valve bonnet 131 until the elbows 171 abut against the shoulders 168 of the valve bonnet 131 at the bottom of the recesses 161. At this time, the assembler then rotates the cover member 157 in either rotational direction to cause the elbows 171 of the spring retainer 158 to be cammed outwardly by the particular cam points 170 of the valve bonnet 131 until the elbows 171 respectively snap into the longitudinal recesses 169 in the manner illustrated in FIG. 6 whereby the cover member 157 is now detachably secured to the valve bonnet 131 as an attempt to pull upwardly on the end cap 157 while the elbows 171 are disposed in the longitudinal grooves or recesses 169 will not cause the elbows 171 to cam outwardly to permit such upward movement. Thus, in order to remove the cap 157, the cap 157 will have to be rotated to cause the elbows 171 to again cam against the cam means 170 and therby snap into the longitudinal recesses 166 so that the cap 157 can be pulled axially upwardly to be removed from the valve bonnet 131.

When the elbows 171 of the spring retainer 158 are received in the longitudinal recesses 169, it can be seen that the longitudinal recesses 169 are relatively long so that the end cap 157 can be rotated relative to the valve bonnet 131 through a relatively large arc of rotation before the elbows 171 will engage the cam parts 170 whereby the cap 157 can be so rotated relative to the valve bonnet 131 to permit alignment for the conduits 162 and 163.

Therefore, it can be seen that this invention provides a unique method for detachably securing the cover member 157 to the valve bonnet 131.

Also, it is to be understood that the cover member 53 for the valve construction 10 of FIG. 1 is likewise detachably secured to the valve bonnet or projection 55 by the wire clip 56 in a like manner.

As previously stated, another feature of this invention is to provide an improved packing gland 144 for the valve stem 140 and the same will now be described.

Figure 5:
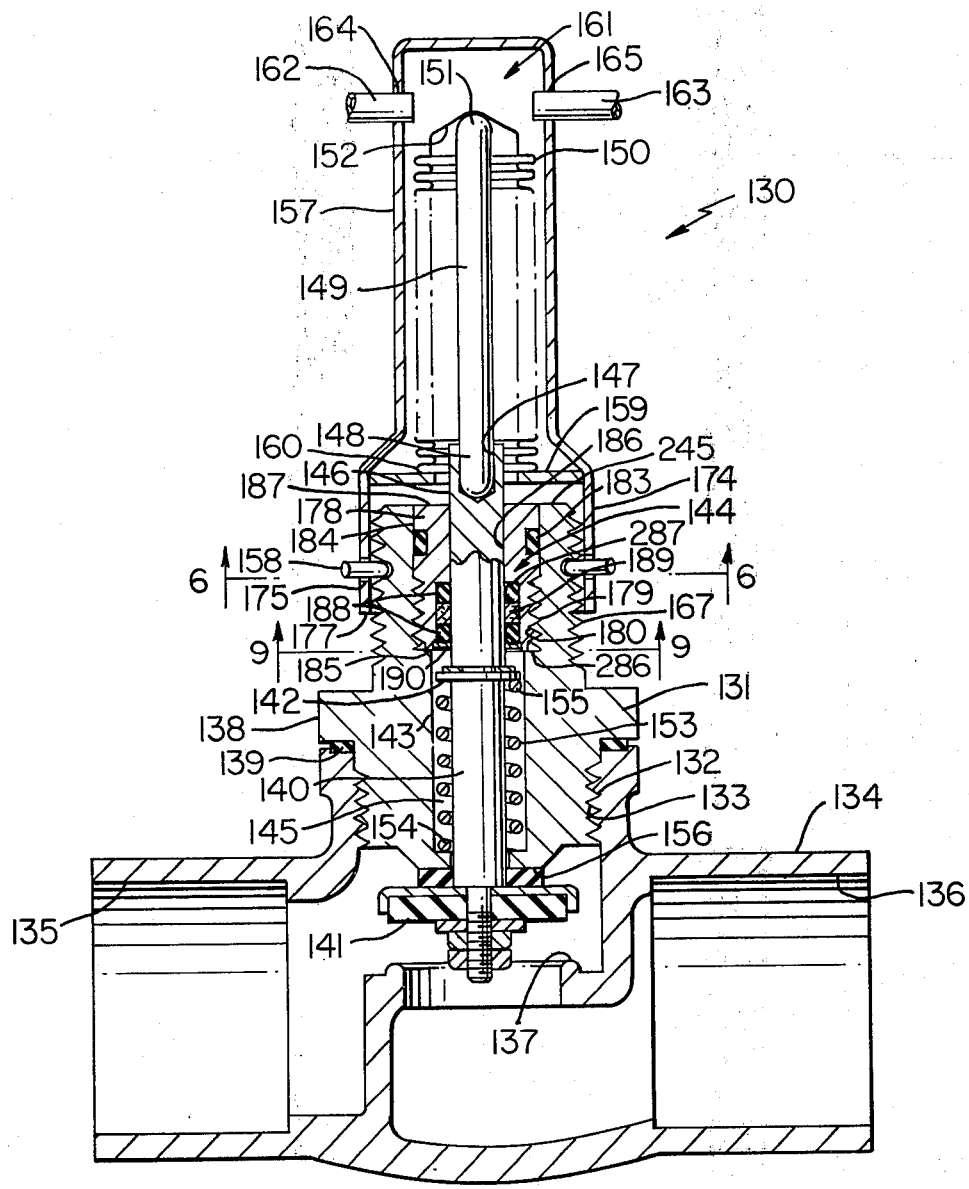
FIG. 5 is a view similar to FIG. 1 and illustrates another embodiment of the valve construction of this invention.

As illustrated in FIGS. 5 and 10, the packing gland 144 comprises a cylindrical housing member 178 having a lower externally threaded portion 179 adapted to be threadedly disposed in an internally threaded portion 180 of the stepped bore 143 of the valve bonnet 131. An annular recess 181 is formed in the external peripheral surface 182 of the housing 178 in an upper portion thereof and the same receives an annular resilient O-ring 183 which is adapted to be radially inwardly compressed by an upper unthreaded part 184 of the stepped bore 143 of the valve bonnet 131 to fully fluid seal the external peripheral surface 182 of the housing 178 to the stepped bore 143 of the valve bonnet 131 when the housing 178 is fully threaded therein and has its lower end 185 bottomed out against an internal annular shoulder 186 of the valve bonnet 131 as illustrated in FIG. 5.

The housing 178 has a stepped bore 186 interrupting the opposed ends 185 and 187 thereof and passing axially therethrough, the stepped bore 186 defining an annular shoulder 187 inboard of the lower end 185 thereof.

A pair of resilient O-rings 198 formed of rubber or other suitable material are disposed in the lower end of the stepped bore 186 of the housing 178 with the upper O-ring 188 being disposed against the annular shoulder 187 and with the lower O-ring 188 being separated from the upper O-ring 188 by an annular lubricant impregnated packing member 189 formed of felt or other suitable material and being compressed between the O-ring 188 in a stacked aligned relation by a washer 190 being disposed in the stepped bore 186 against the lower O-ring 188 and being secured in such position by suitable staking 191 of the end 185 of the housing 178 over the washer 190 as illustrated in FIG. 9.

In this manner, the secured washer 190 maintains the O-rings 188 and intermediate annular packing material 189 in compressed stacked relation between the washer 190 and the internal annular shoulder 187 of the housing 178 whereby the valve stem 140 is adapted to pass axially through the aligned O-rings 188 and packing material 189 to be sealed thereby while still being adapted to be axially moved relative thereto, the O-rings 188 confining the lubricant contained in the packing material 189 between the O-rings 188 so that the valve stem 140 will be sufficiently lubricated by the packing material 189 to permit the axial movement relative thereto.

Therefore, it can be seen that this invention also provides proved packing gland means for the axially movable valve stem of a valve construction or the like.

While the forms of the invention now preferred have been disclosed and described as required by the Patent Statute, other forms may be utilized and still come within the scope of the appended claims.

What is claimed is:

1. In a control device having a packing gland and a movable valve stem or the like passing through said packing gland to be sealed thereto while moving axially relative thereto, the improvement wherein said packing gland carries two resilient O-rings separated by an annular lubricant impregnated packing material, said valve stem passing axially through said O-rings and said annular packing material to be sealed thereby while being axially movable relative thereto, said O-rings and said annular packing material being disposed in stacked and compressed relation, said packing gland having opposed ends interrupted by a stepped bore passing through said packing gland and defining an annular shoulder in said packing gland, one of said O-rings being disposed in stacked compressed relation against said shoulder, and a washer completely disposed within said bore and being disposed against the other O-ring to hold said O-rings and said packing material in said stacked and compressed relation in said packing gland.

2. In a control device as set forth in claim 1, the further improvement wherein said washer is staked in said bore of said packing gland to be fastened thereto.

* * * * *